United States Patent
Komura et al.

(10) Patent No.: US 12,338,879 B2
(45) Date of Patent: Jun. 24, 2025

(54) EXTENSION PIPE AND TRANSPORT ROBOT

(71) Applicant: TOYOTA JIDOSHA KABUSHIKI KAISHA, Aichi-ken (JP)

(72) Inventors: Hirotaka Komura, Tokyo-to (JP); Kunihiro Iwamoto, Nagakute (JP); Yoshiaki Nakamoto, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 23 days.

(21) Appl. No.: 18/340,888

(22) Filed: Jun. 26, 2023

(65) Prior Publication Data
US 2023/0417308 A1  Dec. 28, 2023

(30) Foreign Application Priority Data

Jun. 27, 2022  (JP) ................... 2022-102389

(51) Int. Cl.
| | |
|---|---|
| *F16H 19/06* | (2006.01) |
| *B25J 9/10* | (2006.01) |
| *B25J 18/02* | (2006.01) |
| *F16H 25/20* | (2006.01) |

(52) U.S. Cl.
CPC ............. *F16H 25/20* (2013.01); *B25J 9/104* (2013.01); *B25J 18/02* (2013.01); *F16H 19/0618* (2013.01); *F16H 2025/2062* (2013.01)

(58) Field of Classification Search
CPC ............ F16H 19/0618; F16H 19/0663; F16H 19/0654; F16H 19/064; F16H 19/0645; F16H 2019/0667; B25J 18/02; B25J 18/04

See application file for complete search history.

(56) References Cited

U.S. PATENT DOCUMENTS

| | | | | |
|---|---|---|---|---|
| 2006/0005651 | A1* | 1/2006 | Laforest | ................ B66F 11/00 74/425 |
| 2021/0194388 | A1* | 6/2021 | Iwamoto | ................ H02N 2/025 |
| 2021/0214203 | A1* | 7/2021 | Erickson | ................ B66F 11/00 |
| 2021/0341041 | A1 | 11/2021 | Iwamoto et al. | |

FOREIGN PATENT DOCUMENTS

| | | | |
|---|---|---|---|
| JP | 2007-192257 | * | 8/2007 |
| JP | 4607772 B2 | | 1/2011 |
| JP | 2021-173391 A | | 11/2021 |

\* cited by examiner

*Primary Examiner* — Victor L Macarthur
*Assistant Examiner* — Gregory T Prather
(74) *Attorney, Agent, or Firm* — HAUPTMAN HAM, LLP

(57) ABSTRACT

An extension pipe includes a first belt including a plurality of first engagement pins formed on an upper side along the upper side and a plurality of second engagement pins formed on a lower side along the lower side, a second belt including a plurality of first engagement holes formed on the upper side along the upper side and a plurality of second engagement holes formed on the lower side along the lower side, and a first guide part including a spiral groove configured to spirally guide the first belt and the second belt. A difference between a length of a first trajectory in which each of the first engagement pins moves along the spiral groove and a length of a second trajectory in which each of the second engagement pins moves along the spiral groove is less than half a circumference of the spiral groove.

10 Claims, 9 Drawing Sheets

EXTENSION PIPE AND TRANSPORT ROBOT

CROSS REFERENCE TO RELATED APPLICATIONS

This application is based upon and claims the benefit of priority from Japanese patent application No. 2022-102389, filed on Jun. 27, 2022, the disclosure of which is incorporated herein in its entirety by reference.

BACKGROUND

The present disclosure relates to an extension pipe and a transport robot.

Japanese Unexamined Patent Application Publication No. 2021-173391 discloses a technique for forming an extension pipe by spirally guiding a first belt with engagement pins formed along opposing long sides and a second belt with engagement holes formed along opposing long sides.

In the technique described in Japanese Unexamined Patent Application Publication No. 2021-173391, a length of a trajectory in which the engagement pins provided on an upper side of the first belt are spirally guided differs from a length of a trajectory in which the engagement pins provided on a lower side of the first belt are spirally guided. Therefore, according to the technique described in Japanese Unexamined Patent Application Publication No. 2021-173391, there is a problem that self-excited vibration occurs when the extension pipe is extended or contracted.

The present disclosure has been made to solve such a problem, and an object thereof is to provide an extension pipe and a transport robot that can suppress an occurrence of self-excited vibration when the pipe is extended or contracted.

An extension pipe according to an embodiment includes:
a first belt including a plurality of first engagement pins formed on an upper side along the upper side and a plurality of second engagement pins formed on a lower side along the lower side;
a second belt including a plurality of first engagement holes formed on the upper side along the upper side and a plurality of second engagement holes formed on the lower side along the lower side; and
a first guide part including a spiral groove configured to spirally guide the first belt and the second belt, wherein
the first belt and the second belt are spirally wound so that the corresponding first engagement pins engage the second engagement holes, respectively, and the corresponding second engagement pins engage the first engagement holes, respectively,
each of the first engagement pins and each of the second engagement pins is configured to be insertable into the spiral groove, and
a difference between a length of a first trajectory in which each of the first engagement pins moves along the spiral groove and a length of a second trajectory in which each of the second engagement pins moves along the spiral groove is less than half a circumference of the spiral groove.

The transport robot according to this embodiment includes the extension pipe.

According to the present disclosure, it is possible to provide an extension pipe and a transport robot that can suppress an occurrence of self-excited vibration when the pipe is extended or contracted.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure is described below through embodiments of the disclosure, but the present disclosure according to the claims is not limited to the following embodiments. Moreover, not all of the configurations described in the embodiments are essential as means to solve the problem.

<Background Leading to the Present Disclosure>

Figure 1:
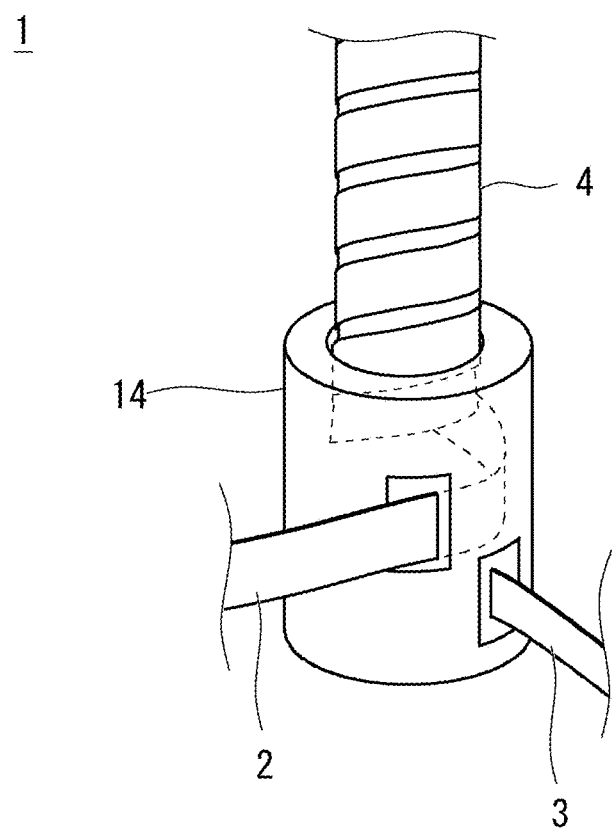
FIG. 1 is a diagram for explaining an overview of an extension pipe according to related art.

First, an overview of an extension pipe according to related art is described with reference to FIG. 1. An extension pipe 1 according to the related art includes a belt guide 14, a first belt 2, a second belt 3, and an extension part 4. The belt guide 14 includes a first opening through which the first belt 2 passes and a second opening through which the second belt 3 passes. The first belt 2 and the second belt 3 engage each other inside the belt guide 14 and are spirally wound. The first belt 2 and the second belt 3 form the extension part 4. The extension part 4 is also referred to as a columnar structure. In the following description, the components other than the extension part 4 are sometimes referred to as a base part. A screw shaft (not shown) is disposed inside the belt guide 14. The screw shaft has a spirally formed groove to spirally guide the first belt 2 and the second belt 3.

Figure 2:
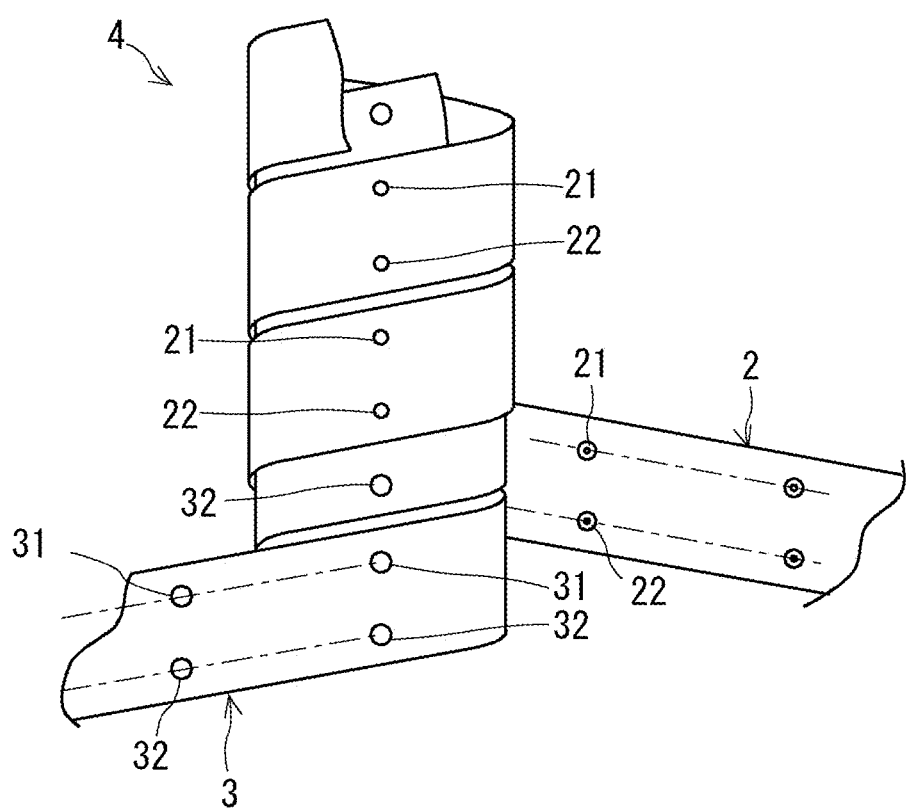
FIG. 2 is a diagram for explaining a configuration of first and second belts.

Next, a configuration of the first belt 2 and the second belt 3 will be described with reference to FIG. 2. The first belt 2 is, for example, a steel band. A plurality of first engagement pins 21 are provided on an upper side along the upper side of the first belt 2. A plurality of second engagement pins 22 are provided on a lower side along the lower side of the first belt 2. The first engagement pins 21 and the second engagement pins 22 are provided at approximately equal intervals.

The second belt 3 is, for example, a steel band having the same thickness as that of the first belt 2. A plurality of first engagement holes 31 are provided on the upper side along the upper side of the second belt 3. A plurality of second engagement holes 32 are provided on the lower side along the lower side of the second belt 3. The pitch of the first engagement holes 31 and the second engagement holes 32 match the pitch of the first engagement pins 21 and the second engagement pins 22.

The second belt 3 is disposed inside the first belt 2 in advance and spirally wound in a state where the second belt 3 and the first belt 2 are displaced from each other to form the extension part 4. At this time, the first engagement pins 21 and the second engagement pins 22 of the first belt 2 project toward the inside of the extension part 4. The first engagement pins 21 of the first belt 2 engage the second engagement holes 32 of the second belt 3, respectively, which are disposed to shift upward with respect to the first belt 2. The second engagement pins 22 of the first belt 2 engage the first engagement holes 31 of the second belt 3, respectively, which are disposed to shift downward with respect to the first belt 2.

Figure 3:
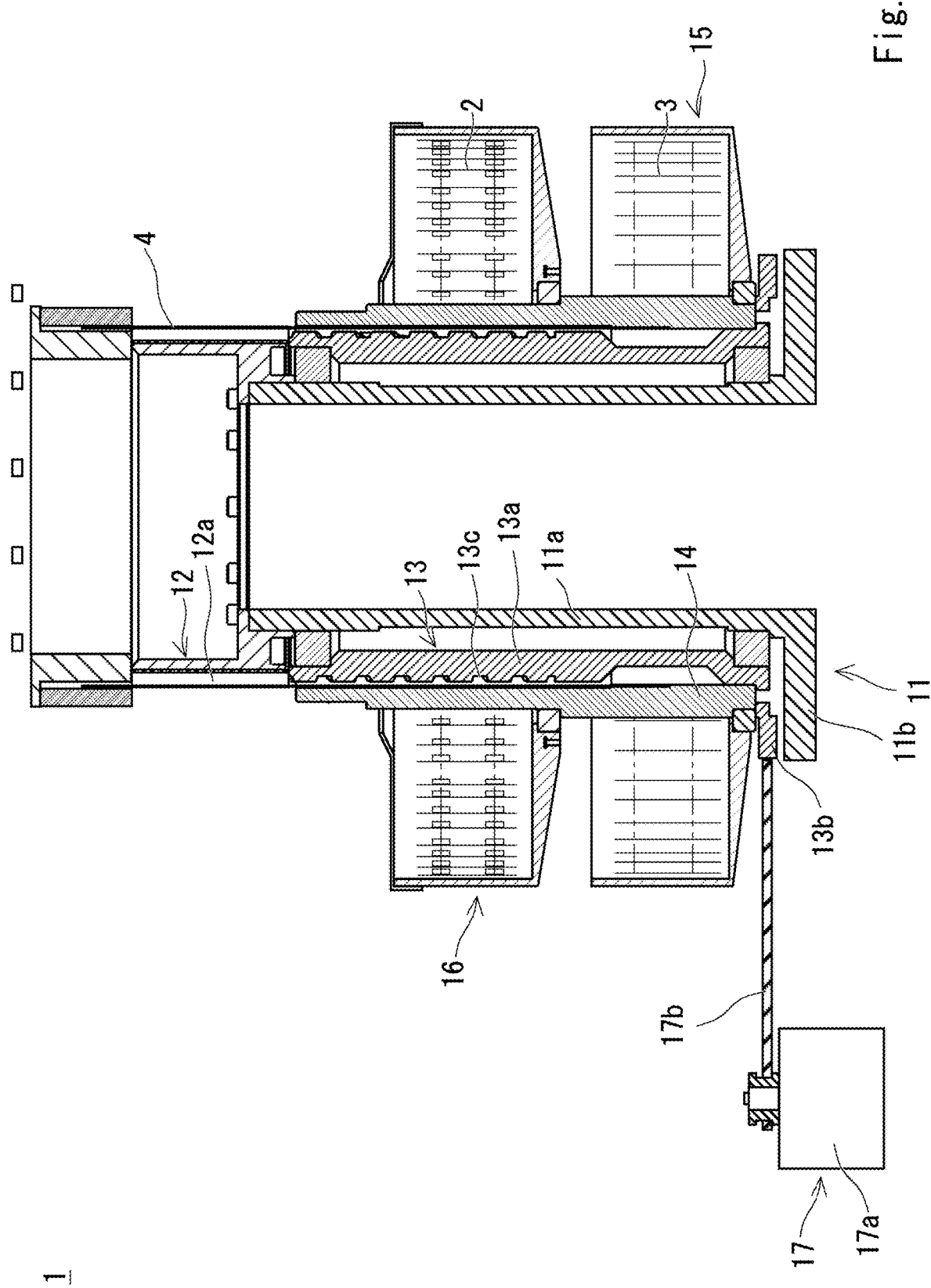
FIG. 3 is a longitudinal cross-sectional view of an extension pipe according to related art.
Figure 4:
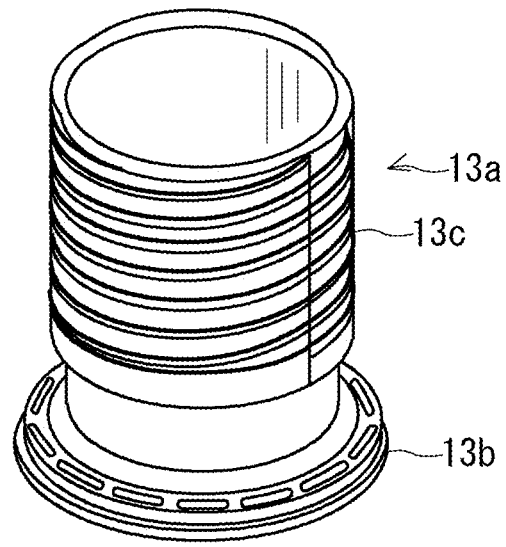
FIG. 4 is a perspective view of a screw shaft included in extension pipe according to the related art.
Figure 5:
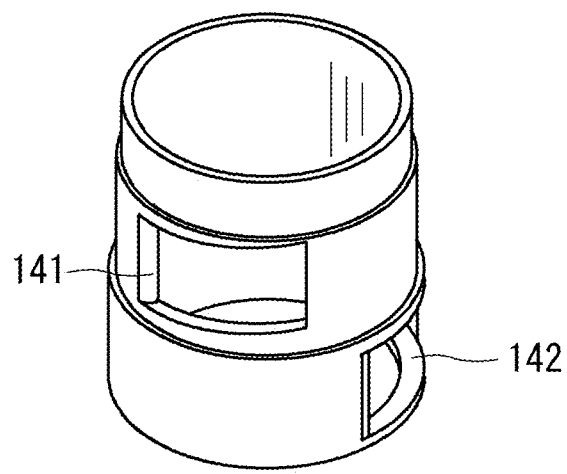
FIG. 5 is a perspective view of a belt guide included in the extension pipe according to the related art.

Next, a configuration of the extension pipe 1 according to the related art is described with reference to FIGS. 3, 4, and 5. FIG. 3 is a longitudinal cross-sectional view of the extension pipe 1. FIG. 4 is a perspective view showing a configuration of a screw shaft 13. FIG. 5 is a perspective view showing a configuration of the belt guide 14. With reference to FIG. 3, the extension pipe 1 includes a main shaft 11, a holding part 12, the screw shaft 13, the belt guide 14, a first belt holder 15, a second belt holder 16, and a drive unit 17.

The main shaft 11 includes a cylindrical part 11a and a flange part 11b. The flange part 11b projects outward from a lower end of the cylindrical part 11a.

The holding part 12 is fixed to an upper end of the cylindrical part 11a of the main shaft 11. The holding part 12 is a cylindrical body, and a groove part 12a extending in the up-down direction is formed on an outer peripheral surface of the holding part 12. The first engagement pins 21 and the second engagement pins 22 of the first belt 2 are engaged with the groove part 12a, which restricts the rotation of the extension part 4.

The screw shaft 13 has a cylindrical part 13a and a flange part 13b as shown in FIG. 4. The screw shaft is also referred to as a first guide part. A spiral groove 13c is formed on an outer peripheral surface of the cylindrical part 13a. The first engagement pins 21 and the second engagement pins 22 included in the first belt 2 are configured to be insertable into the spiral groove 13c. The screw shaft 13 is a multi-threaded screw (e.g., double-thread screw, quad-thread screw) with at least two spirals. The flange part 13b projects outward from a lower end of the cylindrical part 13a.

With reference to FIG. 3, the cylindrical part 11a of the main shaft 11 is passed through the inside of the screw shaft 13. The screw shaft 13 is disposed between the flange part 11b of the main shaft 11 and the holding part 12 in a state in which the screw shaft 13 is rotatable around the main shaft 11.

The belt guide 14 has a cylindrical body as a basic form as shown in FIG. 5. The belt guide 14 is also referred to as a second guide member. The belt guide 14 has a first opening 141 through which the first belt 2 passes and a second opening 142 through which the second belt 3 passes. Each of the first opening 141 and the second opening 142 are formed in a rectangular shape.

With reference to FIG. 3, the cylindrical part 13a of the screw shaft 13 is passed through the inside of the belt guide 14. The lower end of the belt guide 14 is fixed to the flange part 13b of the screw shaft 13.

Thus, the screw shaft 13 and the belt guide 14 can rotate around the main shaft 11. At this time, a gap is formed between the outer peripheral surface of the cylindrical part 13a of the screw shaft 13 and an inner peripheral surface of the belt guide 14 through which the first belt 2 and the second belt 3 can pass while the first belt 2 and the second belt 3 are overlapped.

The first belt holder 15 accommodates the second belt 3 in a belt form before the extension part 4 is formed. The first belt holder 15 has a bottomed cylindrical body as a basic form. A through hole is formed in the bottom of the first belt holder 15. The belt guide 14 is passed through the through hole of the first belt holder 15. The first belt holder 15 is supported by the flange part 13b of the screw shaft 13 in a state in which the first belt holder 15 can be rotated around the belt guide 14.

The second belt holder 16 accommodates the first belt 2 in a belt form before the extension part 4 is formed. The second belt holder 16 has a shape approximately equal to that of the first belt holder 15. A through hole is formed in the bottom of the second belt holder 16. The second belt holder 16 is disposed above the first belt holder 15. The belt guide 14 is passed through the through hole of the second belt holder 16. The second belt holder 16 is supported on a stepped part of the belt guide 14 in a state in which the second belt holder 16 can be rotated around the belt guide 14.

The drive unit 17 includes a motor 17a and a drive transmission unit 17b. The drive transmission unit 17b includes a belt, a pulley, and so on. The drive unit 17 rotationally drives the screw shaft 13 and the belt guide 14. With the rotation of the screw shaft 13, the first belt 2 and the second belt 3 are pulled out and wound spirally to elongate the extension part 4. In addition, with the rotation of the screw shaft 13, the extension part 4 is contracted while the engaged and wound first belt 2 and second belt 3 are being unwound.

Figure 6:
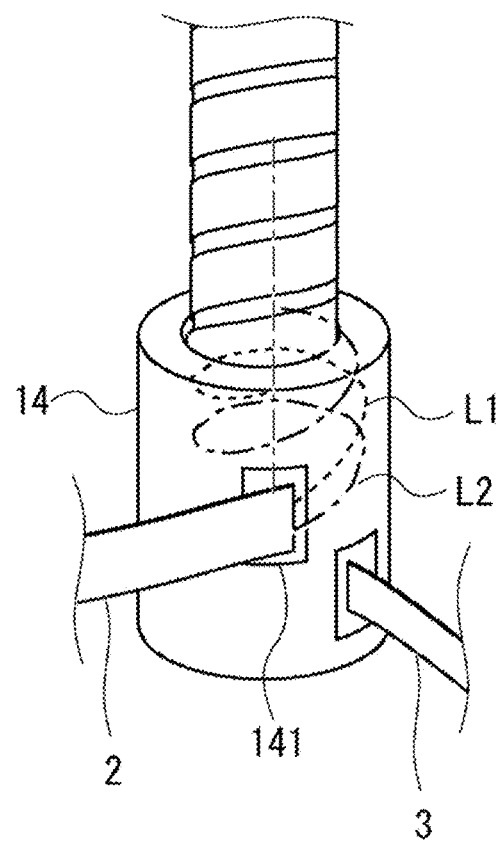
FIG. 6 is a diagram for explaining first and second trajectories.

FIG. 6 shows a trajectory L1 in which the first engagement pins 21 move along the spiral groove 13c of the screw shaft 13 and a trajectory L2 in which the second engagement pins 22 move along the spiral groove 13c. When the first belt 2 enters the first opening 141 of the belt guide 14, the first engagement pins 21 and the second engagement pins 22 are inserted into the spiral groove 13c of the screw shaft 13. Next, the first engagement pins 21 and the second engagement pins 22 are spirally guided while being inserted into the spiral groove 13c. Next, when the first engagement pins 21 and the second engagement pins 22 reach an upper end of the belt guide 14, the first engagement pins 21 and the second engagement pins 22 come out of the spiral groove 13c. Start points of the trajectories L1 and L2 are the points where the first engagement pins 21 and the second engagement pins 22 are inserted into the spiral groove 13c. End points of the trajectories L1 and L2 are the points where the first engagement pin 21 and the second engagement pin 22 come out of the spiral groove 13c.

Figure 7:
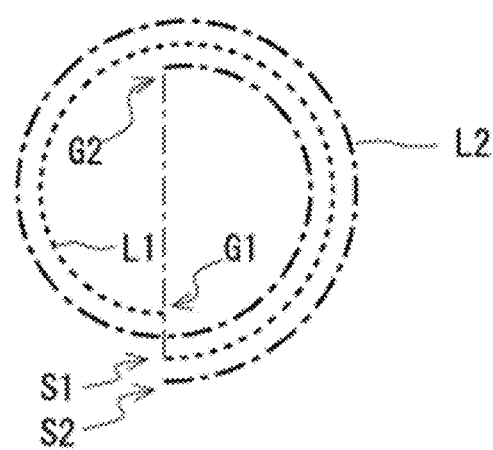
FIG. 7 is a diagram of the first and second trajectories in top view.

FIG. 7 is a top view of the trajectories L1 and L2. Referring to FIG. 7, the length of the trajectory L1 is shorter than the length of the trajectory L2 by half a circumference of the spiral groove 13c. A start point S2 of the trajectory L2 corresponds to a start point S1 of the trajectory L1. On the other hand, an end point G2 of the trajectory L2 corresponds to a point that is advanced by half a circumference of the spiral groove 13c from an end point G1 of trajectory L1. The corresponding points mean the same position in a circumferential direction.

When the length of the trajectory L1 and the length of the trajectory L2 are different, a force that the upper side of the first belt 2 receives does not match a force that the lower side of the first belt 2 receives, and self-excited vibration occurs.

Thus, in the extension pipe according to the related art, there is a problem that self-excited vibration occurs during extension and contraction, because the length of the trajectory L1 differs from that of the trajectory L2. A similar problem exists when the extension pipe according to the related art is contracted.

Therefore, according to the first embodiment and the second embodiment, an extension pipe with a short difference between the length of the trajectory L1 and the length of the trajectory L2 is achieved in order to suppress self-excited vibration.

First Embodiment

Figure 8:
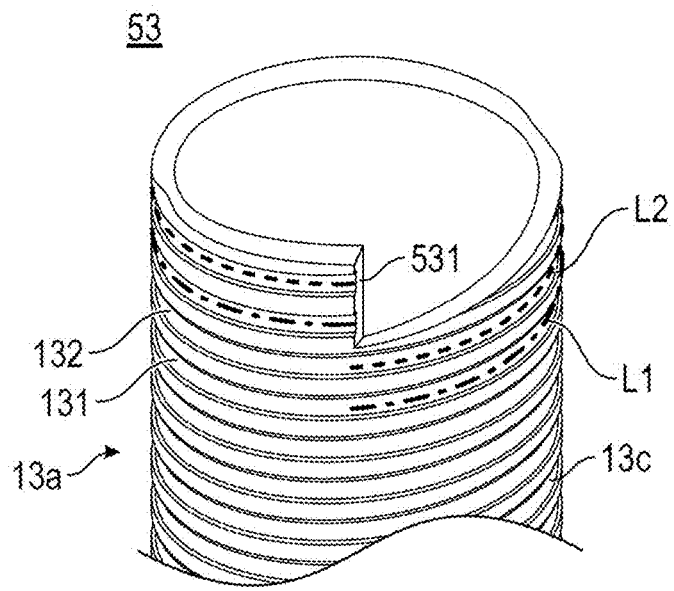
FIG. 8 is a perspective view of a screw included in the extension pipe according to a first embodiment.

An extension pipe according to a first embodiment includes a screw shaft 53 shown in FIG. 8 instead of the screw shaft 13 shown in FIG. 4. A configuration of the extension pipe according to the first embodiment other than this component is similar to that of the related art. The screw shaft 53 is passed inside the belt guide 14 described with reference to FIG. 5.

A notched surface 531 is formed at a leading end of the screw shaft 53. The notched surface 531 is parallel to the axial direction of the screw shaft 53 and parallel to the radial direction of the screw shaft 53. Except for the notched surface 531, the configuration of the screw shaft 53 is the same as that of the screw shaft 13. The cylindrical part 13a of the screw shaft 53 has a spiral groove 13c. The spiral groove 13c includes a first groove 131 and a second groove 132.

FIG. 8 includes a trajectory L1 and a trajectory L2 according to the first embodiment. An end point of the trajectory L1 and an end point of the trajectory L2 are included in the notched surface 531.

Figure 9:
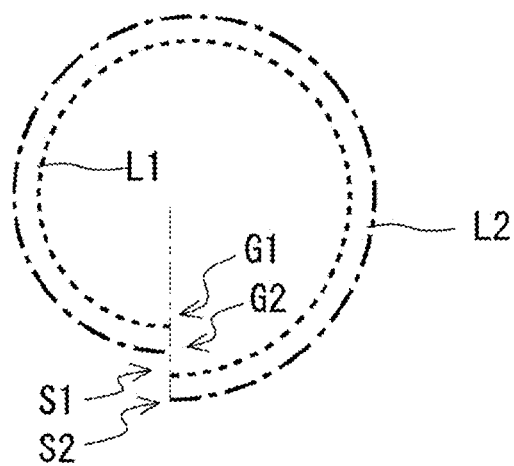
FIG. 9 is a top view of the first and second trajectories according to the first embodiment.

FIG. 9 shows a top view of the trajectory L1 and the trajectory L2. An end point G2 of the trajectory L2 corresponds to an end point G1 of the trajectory L1. This is because the first engagement pins 21 and the second engagement pins 22 come out of the spiral groove 13c at the notched surface 531.

Referring to FIG. 8, the end point of the trajectory L1 is positioned closer to a leading end of the screw shaft 53 than the end point of the trajectory L2. Thus, the difference between the length of the trajectory L1 and the length of the trajectory L2 can be reduced more than that in the related art. In the related art, the end point of the trajectory L1 and the end point of the trajectory L2 are at the same position in the axial direction of the screw shaft 13, which increases the difference between the length of the trajectory L1 and the length of the trajectory L2.

In the extension pipe according to the first embodiment, the length of the trajectory L1 and the length of the trajectory L2 become almost identical. Therefore, the extension pipe according to the first embodiment can suppress self-excited vibration generated during extension and contraction.

If the difference between the length of the trajectory L1 and the length of the trajectory L2 is less than half the circumference of the spiral groove 13c, the generation of self-excited vibration of the extension pipe can be suppressed compared with that in the related art. For example, if the notched surface 531 shown in FIG. 8 is not parallel to the axial direction of the screw shaft 53, the position of the end point of the trajectory L1 and the position of the end point of the trajectory L2 do not match in top view. Even in such a case, the difference between the length of the trajectory L1 and the length of the trajectory L2 can be reduced, and thus an extension pipe with less self-excited vibration can be provided.

According to the first embodiment, by suppressing the occurrence of self-excited vibration, the vibration of the extension pipe during extension and contraction can be suppressed, and the instability of the extension pipe can be eliminated. In addition, the user's anxiety caused by the vibration of the extension pipe can be suppressed. The stress generated in the extension pipe during extension and contraction can be reduced to improve the durability of the extension pipe.

Figure 10:
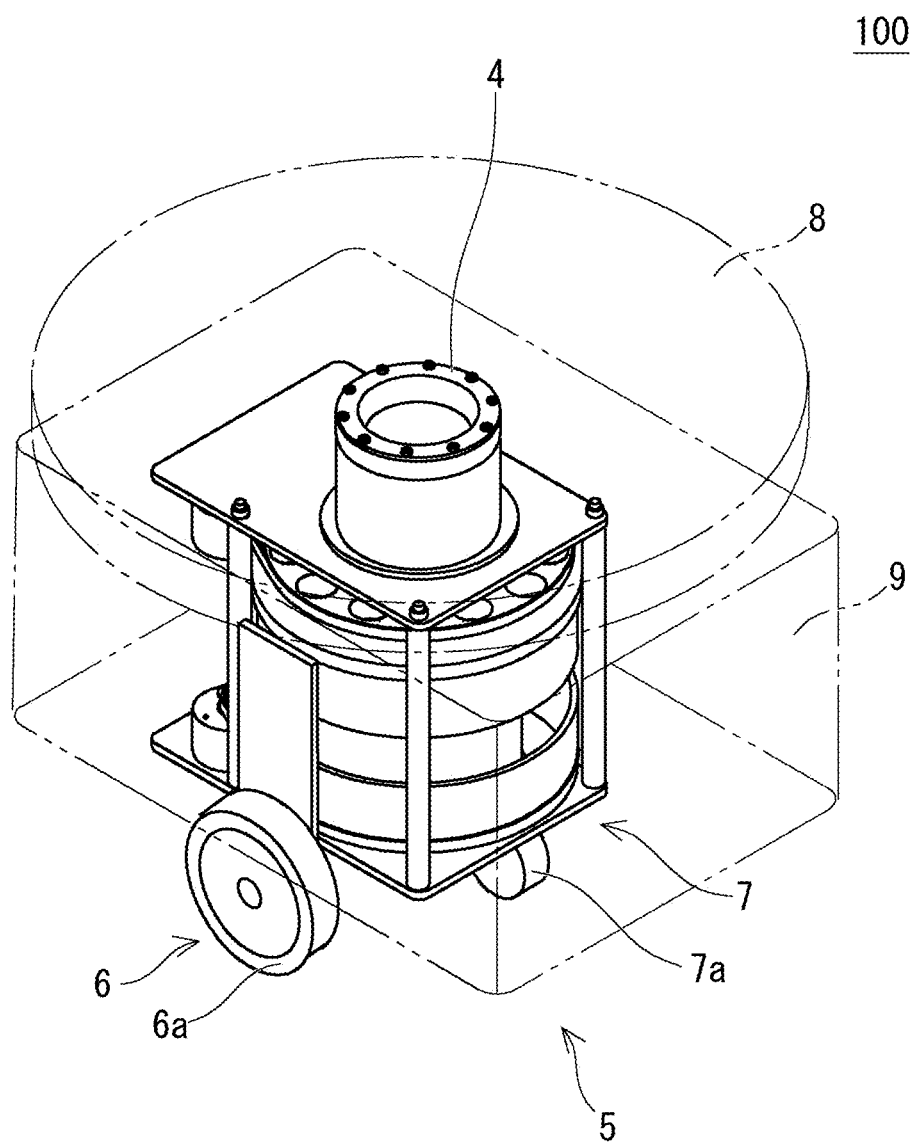
FIG. 10 is a perspective view of a transport robot including the extension pipe according to the first embodiment.
Figure 11:
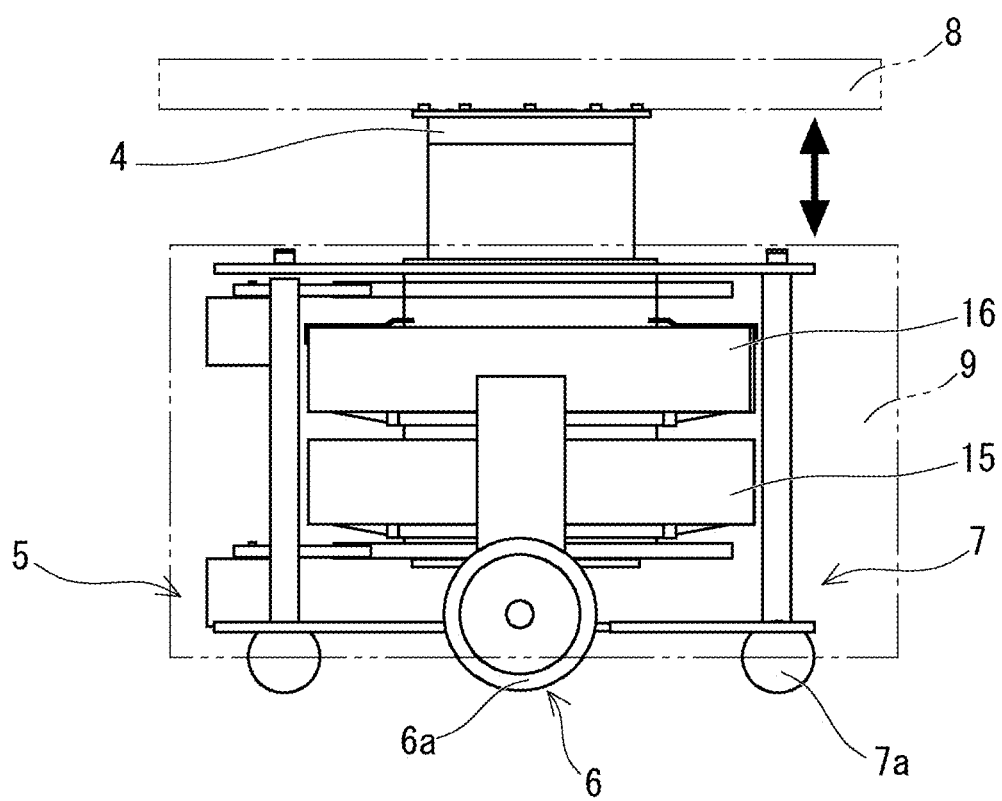
FIG. 11 is a side view of the transport robot including the extension pipe according to the first embodiment.

Next, a transport robot 100 including the extension pipe 5 according to the first embodiment will be described. FIG. 10 is a perspective view schematically showing the transport robot 100, and FIG. 11 is a side view schematically showing the transport robot 100. The transport robot 100 includes the extension pipe 5 and a drive unit 6 as shown in FIGS. 10 and 11. The extension pipe 5 includes an extension part 4 and a base part 7. The extension part 4 is a telescopic extendable cylindrical body as described above, and a plate 8 is provided at an upper end of the extension part 4. An object to be transported is placed on the plate 8.

The base part 7 supports the extension part 4 in such a way that it can be extended and contracted. For example, universal casters 7a are provided at front and rear ends on the lower surface of the base part 7. The base part 7 is preferably covered by, for example, a cover 9. In FIGS. 10 and 11, the plate 8 and the cover 9 are shown by dash-dotted lines to clarify the configuration of the transport robot 100.

The drive unit 6 includes left and right driving wheels 6a, motors not shown, and so on. The left and right driving wheels 6a, motors, and so on are supported by the base part 7. The transport robot 100 advances, reverses, and turns, for example, by rotationally driving the left and right driving wheels 6a individually. The plate 8 is displaced in the up-down direction by the extension part 4 being extended and contracted in the up-down direction. The transport robot 100 may operate under autonomous control or according to an external instruction.

The transport robot according to the first embodiment can suppress excitation applied to the transported object.

Second Embodiment

Figure 12:
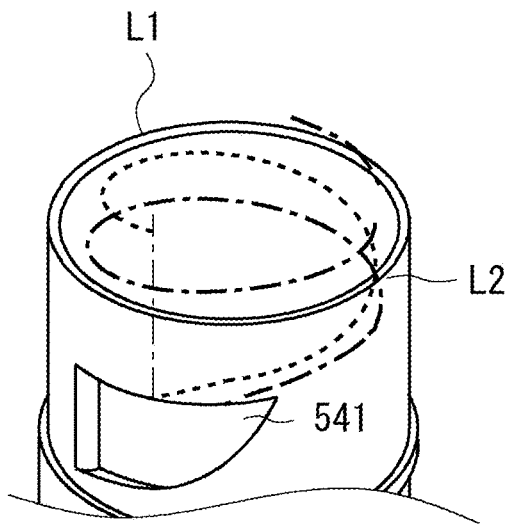
FIG. 12 is a perspective view of a belt guide included in an extension pipe according to a second embodiment.

An extension pipe according to a second embodiment includes a belt guide 54 shown in FIG. 12 instead of the belt guide 14 shown in FIG. 5. A configuration of the extension pipe according to the second embodiment other than the belt guide 54 is similar to that of the related art. The screw shaft 13 described with reference to FIG. 4 is passed through the inside of the belt guide 54. The belt guide 54 includes a first opening 541 instead of the first opening 141. Except for the first opening 541, the configuration of the belt guide 54 is the same as that of the belt guide 14.

FIG. 12 includes a trajectory L1 in which the first engagement pins 21 move along the spiral groove 13c of the screw shaft 13 and a trajectory L2 in which the second engagement pins 22 move into the spiral groove 13c. The first opening 541 is formed in a trapezoidal shape so that the upper side is longer than the lower side. The first opening 541 may be formed in a triangular shape with a bottom side at the top and an apex at the bottom. The first belt 2 enters the inside of the belt guide 54 from the upper side of the first opening 541. The second engagement pins 22 are inserted into the spiral groove 13c of the screw shaft 13 later than the first engagement pins 21.

With the first belt 2 restrained by the belt guide 54, the first engagement pins 21 and the second engagement pins 22 are inserted into the spiral groove 13c. Therefore, the start point of the trajectory L1 or the start point of the trajectory L2 can be changed according to the shape of the first opening 541.

The shape of the first opening 541 shown in FIG. 12 is an example. For example, the first opening 541 may be formed larger so that the second engagement pins 22 are inserted into the spiral groove 13c at a half the circumference of the spiral groove 13c later in the spiral direction than the first engagement pins 21. In this manner, the length of the trajectory L1 and the length of the trajectory L2 can be almost identical.

Figure 13:
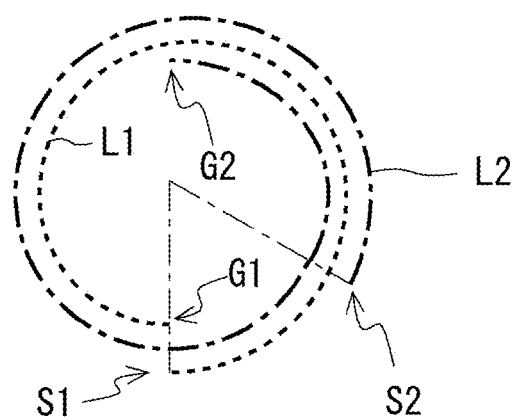
FIG. 13 is a top view of first and second trajectories according to the second embodiment.

FIG. 13 shows a top view of the trajectory L1 and the trajectory L2. As with the related art, the end point G2 of the trajectory L2 is advanced by half the circumference of the spiral groove 13c in the spiral direction from the end point G1 of the trajectory L1. However, unlike the related art, the start point S2 of the trajectory L2 is advanced in the spiral direction compared to the start point S1 of the trajectory L1. Therefore, the difference between the length of the trajectory L1 and the length of the trajectory L2 is shorter than half the circumference of the spiral groove 13c.

With reference to FIG. 12, the first opening 541 is designed so that the start point of the trajectory L1 and the start point of the trajectory L2 are at the same position in the axial direction of the screw shaft 13 (in the axial direction of the belt guide 54). This allows the difference between the length of the trajectory L1 and the length of the trajectory L2 to be reduced compared to that in the related art. In the related art, the start point of the trajectory L1 is positioned closer to the leading end of the screw than the start point of the trajectory L2, which increases the difference between the length of the trajectory L1 and the length of the trajectory L2.

The extension pipe according to the second embodiment can reduce the difference between the lengths of the trajectories L1 and L2 in comparison with that in the related art, thus suppressing the occurrence of self-excited vibration in a manner similar to that in the first embodiment. The same is true for the transport robot including the extension pipe according to the second embodiment.

It should be noted that the present disclosure is not limited to the above embodiments, and can be changed as appropriate without departing from the purport.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An extension pipe, comprising:
a first belt including a plurality of first engagement pins provided on an upper side along the upper side and a plurality of second engagement pins provided on a lower side along the lower side;
a second belt including a plurality of first engagement holes provided on the upper side along the upper side and a plurality of second engagement holes provided on the lower side along the lower side; and
a first guide part including a spiral groove configured to spirally guide the first belt and the second belt, the spiral groove including a first spiral groove and a second spiral groove that are different from each other, wherein
the first belt and the second belt are spirally wound around the first guide part so that the corresponding first engagement pins engage the second engagement holes, respectively, and the corresponding second engagement pins engage the first engagement holes, respectively,
each of the first engagement pins and each of the second engagement pins are configured to be insertable into the first and second spiral grooves, respectively,
a first trajectory, in which each of the first engagement pins is configured to move along the first spiral groove, includes a first start point where the first engagement pins are inserted in the first spiral groove and a first end point where the first engagement pins come out of the first spiral groove,
a second trajectory, in which each of the second engagement pins is configured to move along the second spiral groove, includes a second start point where the second engagement pins are inserted in the second spiral groove and a second end point where the second engagement pins come out of the second spiral groove, and
a difference between a length of the first trajectory from the first start point to the first end point along the first spiral groove and a length of the second trajectory from the second start point to the second end point along the second spiral groove is less than half a circumference of a single wrap of the first spiral groove or half a circumference of a single wrap of the second spiral groove.

2. The extension pipe according to claim 1, wherein a distance between the first end point of the first trajectory and a leading end of the first guide part is less than a distance between the second end point of the second trajectory and the leading end of the first guide part.

3. The extension pipe according to claim 2, wherein a notched surface is provided at the leading end of the first guide part along an axial direction of the first guide part, and
the first end point of the first trajectory and the second end point of the second trajectory are included in the notched surface.

4. The extension pipe according to claim 2, wherein a notched surface is provided at a leading end of the first guide part along a longitudinal direction of the first guide part, and
the first end point of the first trajectory and the second end point of the second trajectory are included in the notched surface.

5. The extension pipe according to claim 4, wherein the notched surface is a flat surface.

6. The extension pipe according to claim 4, wherein the notched surface is parallel to the longitudinal direction of the first guide part and parallel to a radial direction of the first guide part.

7. The extension pipe according to claim 1, wherein the second start point of the second trajectory is a point advanced in a direction along which the first belt is spirally wound around the first guide part compared to the first start point of the first trajectory.

8. The extension pipe according to claim 7, further comprising:
- a second guide part including a first opening through which the first belt is passed and a second opening through which the second belt is passed, wherein
- the first guide part is passed inside the second guide part, and
- the first start point of the first trajectory and the second start point of the second trajectory are at a same position in the axial direction of the first guide part.

9. The extension pipe according to claim 1, wherein the length of the first trajectory is substantially the same as the length of the second trajectory.

10. A transport robot, comprising: an extension pipe, the extension pipe including:
- a first belt including a plurality of first engagement pins provided on an upper side along the upper side and a plurality of second engagement pins provided on a lower side along the lower side;
- a second belt including a plurality of first engagement holes provided on the upper side along the upper side and a plurality of second engagement holes provided on the lower side along the lower side; and
- a first guide part including a spiral groove configured to spirally guide the first belt and the second belt, the spiral groove including a first spiral groove and a second spiral groove that are different from each other, wherein
- the first belt and the second belt are spirally wound around the first guide part so that the corresponding first engagement pins engage the second engagement holes, respectively, and the corresponding second engagement pins engage the first engagement holes, respectively,
- each of the first engagement pins and each of the second engagement pins are configured to be insertable into the first and second spiral grooves, respectively,
- a first trajectory, in which each of the first engagement pins is configured to move along the first spiral groove, includes a first start point where the first engagement pins are inserted in the first spiral groove and a first end point where the first engagement pins come out of the first spiral groove,
- a second trajectory, in which each of the second engagement pins is configured to move along the second spiral groove, includes a second start point where the second engagement pins are inserted in the second spiral groove and a second end point where the second engagement pins come out of the second spiral groove, and
- a difference between a length of the first trajectory from the first start point to the first end point along the first spiral groove and a length of the second trajectory from the second start point to the second end point along the second spiral groove is less than half a circumference of a single wrap of the first spiral groove or half a circumference of a single wrap of the second spiral groove.

* * * * *